United States Patent
Momiyama et al

[11] 3,982,823
[45] Sept. 28, 1976

[54] RETROFOCUS WIDE-ANGLE OBJECTIVE LENS SYSTEM OF LARGE RELATIVE APERTURE

[75] Inventors: Kikuo Momiyama, Chofo; Yujiro Agari, Tokyo, both of Japan

[73] Assignee: Canon Kabushiki Kaisha, Tokyo, Japan

[22] Filed: June 13, 1975

[21] Appl. No.: 586,550

Related U.S. Application Data

[63] Continuation of Ser. No. 387,038, Aug. 9, 1973, abandoned.

[30] Foreign Application Priority Data

Aug. 23, 1972 Japan.................................. 47-84315

[52] U.S. Cl................................ 350/214; 350/176; 350/207

[51] Int. Cl.$^2$............................................. G02B 9/64
[58] Field of Search...................... 350/176, 207, 214

[56] References Cited
UNITED STATES PATENTS

3,884,556   5/1973   Nakagawa............................ 350/214

*Primary Examiner*—Paul A. Sacher
*Attorney, Agent, or Firm*—Toren, McGeady and Stanger

[57] ABSTRACT

A retrofocus wide-angle objective lens having a range of at least 75° with a large relative aperture and which is corrected for various aberrations and particularly curvature of field at the outer portions of the viewing field.

3 Claims, 4 Drawing Figures

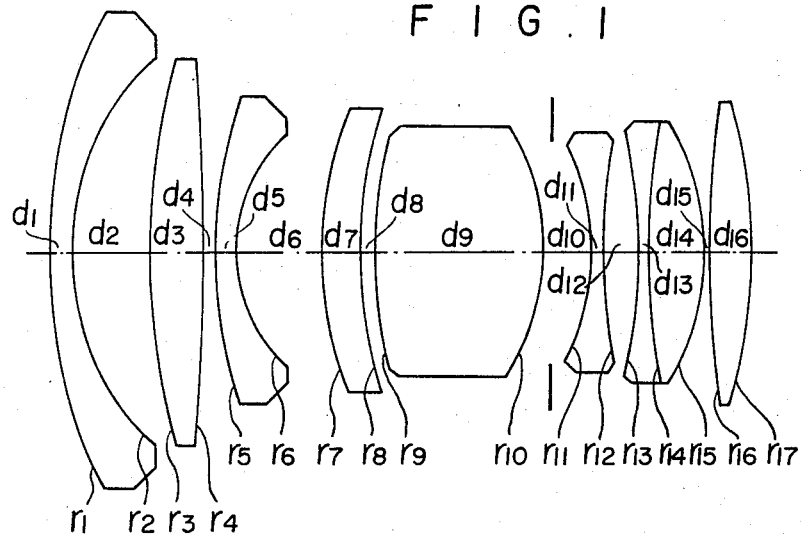
FIG. I
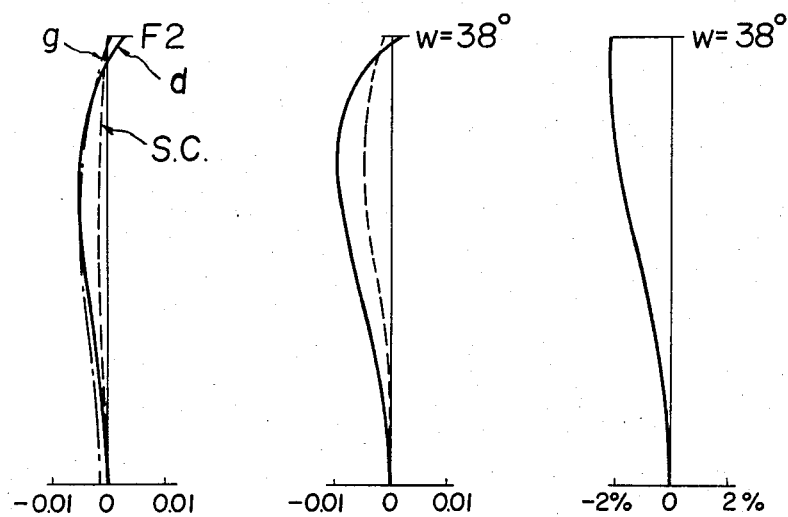
FIG. 2

RETROFOCUS WIDE-ANGLE OBJECTIVE LENS SYSTEM OF LARGE RELATIVE APERTURE

This is a continuation of application Ser. No. 387,038 filed Aug. 9, 1973, now abandoned.

DETAILED DESCRIPTION OF THE INVENTION

This invention relates to a retrofocus ultrawide-angle camera objective which has a relative aperture of less than 2.8 in F-number with an field angle of at least 75°, and which also is so designed that the back focus length is sufficient long to permit the quick-return pivoting operation of the reflecting mirror incorporated in a single lens reflex camera.

In retrofocus wide-angle objectives of the conventional type, it is often unavoidable that the curvature of field at the lateral or outer portions of the viewing field is over-corrected with the result of a considerable drop in image sharpness at the edge regions of the image. Particularly when this known construction is modified so as to provide a furthermore increased relative aperture and simultaneously a short total length, the resulting drawback is so intensified as to abandon its use.

Accordingly, the present invention has for a general object to provide an optical objective system designed so as to have a wide-angle of field and compact structure while nevertheless being well corrected for various aberrations.

Further objects and advantages will become apparent during the course of the following description with reference to the accompanying drawings in which:

FIG. 1 is a diagrammatic view of one example of a practical wide-angle objective in accordance with the present invention.

FIG. 2 is a graphic representation of spherical aberrations, sine condition, astigmatism and distortion in the corrected objective shown in FIG. 1.

Figure 3:
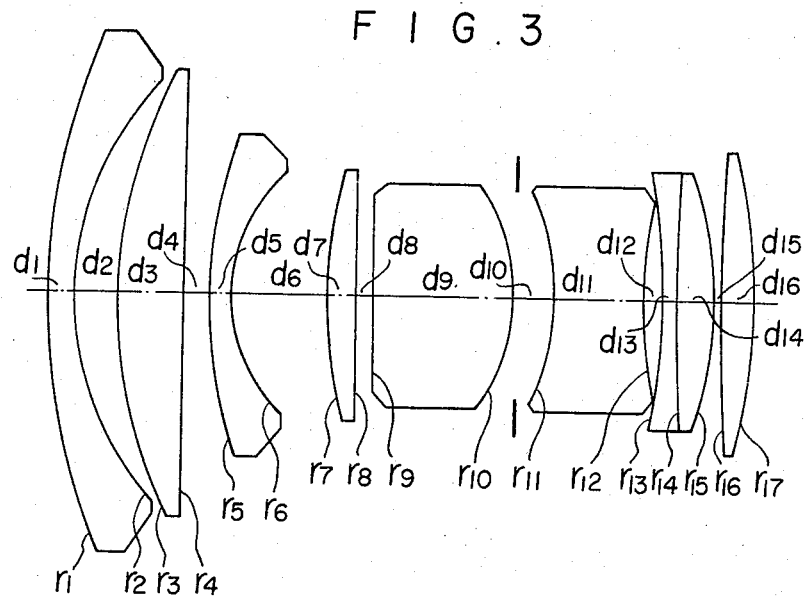
FIG. 3 is a diagrammatic view of a further example of a practical wide-angle objective in accordance with the present invention.

Now referring to FIGS. 1 and 3, in order to accomplish the foresaid object, the lens system constructed in accordance with the present invention comprises eight optically aligned lens components, of which the first component designated by Roman character I counting from the front is a concave meniscus lens of rearward concavity, component II is a convex lens, component III is a concave meniscus lens of rearward concavity, component IV is a concave lens of which the strongly curved surface, or the surface with a smaller radius of curvature than that of the other faces toward the object, component V is a convex lens of strong rearward convexity, component VI is a double concave lens, components VII is a convex meniscus doublet consisting of a concave lens and a convex lens cemented together, and component VIII is a double convex lens, and having a diaphragm interposed between components V and VI.

In the eight-component lens system, the symbols for lens parameters denote the following:

$f$: The equivalent focal length of the entire system
$r$: The radii of curvature of the individual refracting surfaces
$d$: The axial separations between the retracting surfaces
$N$: The refractive indices of the individual lens glasses
$\nu$: The Abbe number of the individual lens glasses Thus, the wide-angle objective of the present invention is characterized by good aberration correction effected by satisfying the following conditions in combination:

$$0.35f < d_7 + d_8 + d_9 < 0.8f \tag{1}$$

$$0.5 \ |r_{13}|/r_{12} < 2.0 \ ; \ r_{13} < 0 \tag{2}$$

$$0.03f < d_{12} < 0.13f \tag{3}$$

$$1.73 < \frac{N_8 + N_9}{2} \tag{4}$$

$$\nu_4 < 35.0 \tag{5}$$

$$2.0 < \nu_6 - \nu_7 < 20.0 \tag{6}$$

The meanings of the above specified conditions and their limit values will be explained herebelow.

Condition (1) defines the limits for permitting the design of an objective so as to cover a wide-angular field of view and simultaneously shorten the total length while still maintaining a good state of correction for field curvature at the outer regions of the viewing field. As the deviation down from the lower limit increases, the field curvature at the outer portions rapidly increases to result in a strong over-correction, whilst as the upper limit is exceeded, the total length increases with an increase in the diameter of the front lens assembly so that the bulk of the complete lens system cannot be minimized in good proportion.

Condition (2) has an effect on the optical performance of an air lens intervening between components VI and VII. As far as the lens system of the type described is concerned, the provision of the air lens is effective for the correction of distortion ascribable to the concave lenses on the object side of the air lens, but this effect is remarkably reduced, as the relative aperture of the lens system increases. In order to secure the effect sufficiently even in a greatly increased relative aperture range, condition (2) is required. When the upper limit is exceeded, or when $r_{12}$ is far smaller than the absolute value of $r_{13}$, spherical aberrations increase. When the lower limit is violated, or when $r_{12}$ is far longer than the absolute value of $r_{13}$, the correction for negative distortion is difficult to be achieved. From the standpoint of severer lens design specification, it is desirable for $|r_{13}|/r_{12}$ to lie between 0.7 and 1.5.

Condition (3) provides the adjustment of the axial thickness of the air lens in order to compensate residual distortion and astigmatism resulting from the dependence of aberration correction for completeness upon not only conditions (2) but also the balancing with other elements of the objective. When the upper limit is violated, a remarkable under-correction of distortion is effected. When the lower limit is violated, a remarkable under-correction of astigmatism is effected.

Condition (4) is concerned with a range in the effective reduction of field curvature at the intermediate portions under the above-mentioned condtions (1), (2) and (3) and it is also effective for the purpose of facilitating the correction of spherical aberrations ascribable to the convex lenses of components VII and VIII. When the limit is violated, it is impossible to secure these effects.

As far as the lens system of the type described, the correction of chromatic aberrations is achieved usually by virtue of the choice of lowly dispersive glasses for the concave lenses arranged on the object side of the diaphragm and highly dispersive glasses for the convex lenses arranged thereon. However, the use of such convex lenses causes color coma and color distortion to be strongly over-corrected.

Condition (5) prevents such over-corrections of color aberrations. Inasmuch as condition (5) is satisfied, due correction for chromatic aberrations can be achieved by increasing the dispersive power of component IV and decreasing the dispersive power of component V while avoiding increases in color coma and color distortion ascribable to the strong rearward convexity of the component V. When $\nu_4$ is increased from the specified limit value, $\nu_5$ must be decreased for the maintenance of the equivalent chromatic aberration correction, or otherwise color coma and color distortion increase. The practical upper limits of conditions (4) and (5) depend on the characteristics of available glasses, whereby it is preferred that $(N_8 + N_9)/2$ and $\nu_4$ are deviated from the above-specified limit values as much as possible.

Condition (6) works effectively on the correction for color coma and color distortion ascribable to the lens components arranged on the image side of the diaphragm. When the lower limit is violated, color coma and color distortion ascribable to the front surface of the air lens formed between components VI and VII in accordance with conditions (2) and (3) increase. When the upper limit is violated, color astigmatism ascribable to the rear surface of the air lens increases.

Figure 4:
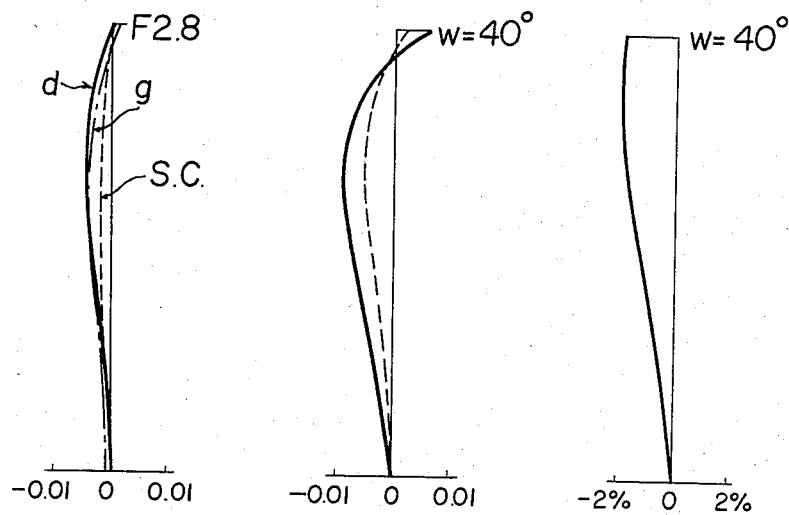
FIG. 4 is a graphic representation of spherical aberrations, sine condition, astigmatism and distortion in the corrected objective shown in FIG. 3.

By satisfying the above-specified conditions, the retrofocus wide-angle objective can be constructed as represented by the numerical data in Table 1 or Table 3 for the radii of curvature of the individual refracting surfaces, $r_1$ to $r_{17}$, the negative sign indicating that the surface is concave to the front, the axial thickness of the individual elements, or the axial air separation between the components, $d_1$ to $d_{16}$ along with the corresponding refractive indices, $N_1$ to $N_9$ and the Abbe numbers $\nu_1$ to $\nu_9$ of which the individual lens elements are made. The numerical data of the first practical example in Table 1 are related to the lens system of FIG. 1. The aberration curves of the corrected lens system shown in FIG. 1 are illustrated in FIG. 2a, 2b and 2c. The numerical data of the second practical example in Table 3 are related to the lens system of FIG. 3, and its aberration curves are illustrated in FIGS. 4a, 4b and 4c.

As far as the present invention is concerned, the permissible limit of variation for the parameters of the lens system from the values stated in respect of each of the two examples, are ±5% for the inverse number of the radius of curvature (1/r), ±5% for the thickness or separation (d), ±0.03 for the refractive index, and ±5% for the dispersive power (1/$\nu$).

Table 1

| | $f = 1$ | | F 2.0 | | $2\omega = 76°$ |
|---|---|---|---|---|---|
| $r_1$ = | 1.7090 | | | | |
| | | $d_1$ = | 0.0707 | $N_1 = 1.64328$ | $\nu_1 = 47.85$ |
| $r_2$ = | 0.8800 | | | | |
| | | $d_2$ = | 0.2743 | | |
| $r_3$ = | 2.5246 | | | | |
| | | $d_3$ = | 0.1646 | $N_2 = 1.58913$ | $\nu_2 = 61.11$ |
| $r_4$ = | −9.0518 | | | | |

Table 1-continued

| | $f = 1$ | | F 2.0 | | $2\omega = 76°$ |
|---|---|---|---|---|---|
| | | $d_4$ = | 0.0661 | | |
| $r_5$ = | 1.3704 | | | | |
| | | $d_5$ = | 0.0536 | $N_3 = 1.65100$ | $\nu_3 = 56.15$ |
| $r_6$ = | 0.4995 | | | | |
| | | $d_6$ = | 0.2571 | | |
| $r_7$ = | 1.1928 | | | | |
| | | $d_7$ = | 0.0821 | $N_4 = 1.75520$ | $\nu_4 = 27.51$ |
| $r_8$ = | 3.4759 | | | | |
| | | $d_8$ = | 0.0357 | | |
| $r_9$ = | 3.6293 | | | | |
| | | $d_9$ = | 0.6179 | $N_5 = 1.67790$ | $\nu_5 = 55.33$ |
| $r_{10}$ = | −0.8696 | | | | |
| | | $d_{10}$ = | 0.1536 | | |
| $r_{11}$ = | −0.8850 | | | | |
| | | $d_{11}$ = | 0.0611 | $N_6 = 1.62004$ | $\nu_6 = 36.25$ |
| $r_{12}$ = | 1.5573 | | | | |
| | | $d_{12}$ = | 0.1036 | | |
| $r_{13}$ = | −1.4292 | | | | |
| | | $d_{13}$ = | 0.0357 | $N_7 = 1.80518$ | $\nu_7 = 25.43$ |
| $r_{14}$ = | 2.0409 | | | | |
| | | $d_{14}$ = | 0.1654 | $N_8 = 1.77250$ | $\nu_8 = 49.57$ |
| $r_{15}$ = | −0.7961 | | | | |
| | | $d_{15}$ = | 0.0036 | | |
| $r_{16}$ = | −3.2359 | | | | |
| | | $d_{16}$ = | 0.1361 | $N_9 = 1.77250$ | $\nu_9 = 49.57$ |
| $r_{17}$ = | −2.3112 | | | | |

Back focus = 1.3346

Table 2

| No. | Aberration Coefficients in Example 1 | | | | |
|---|---|---|---|---|---|
| | I | II | III | P | V |
| 1 | 0.0477 | 0.0376 | 0.0296 | 0.2291 | 0.2039 |
| 2 | −1.0121 | 0.1834 | −0.0332 | −0.4448 | 0.0867 |
| 3 | 0.1958 | 0.1149 | 0.0675 | 0.1468 | 0.1258 |
| 4 | 0.0002 | −0.0016 | 0.0161 | 0.0410 | −0.5569 |
| 5 | 0.1465 | 0.0957 | 0.0625 | 0.2877 | 0.2287 |
| 6 | −10.7936 | 1.5168 | −0.2131 | −0.7893 | 0.1409 |
| 7 | 4.5474 | 0.5541 | 0.0675 | 0.3607 | 0.0522 |
| 8 | −0.2371 | −0.1907 | −0.1534 | −0.1238 | −0.2229 |
| 9 | 0.2206 | 0.1837 | 0.1529 | 0.1113 | 0.2200 |
| 10 | 8.5241 | −2.5711 | 0.7755 | 0.4646 | −0.3740 |
| 11 | −5.9891 | 1.6225 | −0.4395 | −0.4325 | 0.2362 |
| 12 | −0.6955 | −0.5679 | −0.4637 | −0.2458 | −0.5794 |
| 13 | 0.0154 | −0.0223 | 0.0323 | −0.3121 | 0.4059 |
| 14 | −0.1189 | −0.0646 | −0.0350 | −0.0050 | −0.0217 |
| 15 | 3.0533 | −0.3932 | 0.0506 | 0.5475 | −0.0770 |
| 16 | −0.0027 | −0.0104 | −0.0404 | 0.1347 | 0.3646 |
| 17 | 2.7356 | −0.5173 | 0.0978 | 0.1886 | −0.0542 |
| Σ | 0.6376 | −0.0304 | −0.0261 | 0.1587 | 0.1786 |

Table 3

| | $f = 1$ | | F 2.8 | | $2\omega = 80°$ |
|---|---|---|---|---|---|
| $r_1$ = | 1.4927 | | | | |
| | | $d_1$ = | 0.0563 | $N_1 = 1.66672$ | $\nu_1 = 48.32$ |
| $r_2$ = | 0.7418 | | | | |
| | | $d_2$ = | 0.1336 | | |
| $r_3$ = | 1.4464 | | | | |
| | | $d_3$ = | 0.1542 | $N_2 = 1.62041$ | $\nu_2 = 60.27$ |
| $r_4$ = | 27.1473 | | | | |
| | | $d_4$ = | 0.0704 | | |
| $r_5$ = | 1.1989 | | | | |
| | | $d_5$ = | 0.0423 | $N_3 = 1.67790$ | $\nu_3 = 55.33$ |
| $r_6$ = | 0.4236 | | | | |
| | | $d_6$ = | 0.2714 | | |
| $r_7$ = | 1.2905 | | | | |
| | | $d_7$ = | 0.0648 | $N_4 = 1.80518$ | $\nu_4 = 25.43$ |
| $r_8$ = | 34.2692 | | | | |
| | | $d_8$ = | 0.0423 | | |
| $r_9$ = | 24.0238 | | | | |
| | | $d_9$ = | 0.3358 | $N_5 = 1.58913$ | $\nu_5 = 61.11$ |
| $r_{10}$ = | −0.7445 | | | | |
| | | $d_{10}$ = | 0.1070 | | |
| $r_{11}$ = | −0.9866 | | | | |
| | | $d_{11}$ = | 0.2268 | $N_6 = 1.67270$ | $\nu_6 = 32.10$ |
| $r_{12}$ = | 1.6820 | | | | |
| | | $d_{12}$ = | 0.0507 | | |
| $r_{13}$ = | −1.1886 | | | | |
| | | $d_{13}$ = | 0.0338 | $N_7 = 1.80518$ | $\nu_7 = 25.43$ |
| $r_{14}$ = | −3.9876 | | | | |
| | | $d_{14}$ = | 0.1183 | $N_8 = 1.77250$ | $\nu_8 = 49.57$ |
| $r_{15}$ = | −0.7141 | | | | |
| | | $d_{15}$ = | 0.0042 | | |
| $r_{16}$ = | 8.6313 | | | | |
| | | $d_{16}$ = | 0.0901 | $N_9 = 1.77250$ | $\nu_9 = 49.57$ |

Table 3-continued

| | $f = 1$ | F 2.8 | $2\omega = 80°$ |
|---|---|---|---|
| $r_{17}$ = | −1.4720 | | |
| | | Back focus = 1.4460 | |

Table 4

| No. | Aberration Coefficients in Example 2 | | | | |
|---|---|---|---|---|---|
| | I | II | III | P | V |
| 1 | 0.0722 | 0.0569 | 0.0448 | 0.2680 | 0.2466 |
| 2 | −1.8412 | 0.1753 | −0.0167 | −0.5392 | 0.0529 |
| 3 | 0.6206 | 0.1775 | 0.0508 | 0.2647 | 0.0902 |
| 4 | −0.0001 | −0.0009 | −0.0166 | −0.0141 | −0.5401 |
| 5 | 0.1792 | 0.1245 | 0.0864 | 0.3370 | 0.2940 |
| 6 | −16.0951 | 1.3993 | −0.1217 | −0.9537 | 0.0935 |
| 7 | 5.7642 | 1.3557 | 00.2238 | 0.3456 | 0.1122 |
| 8 | −0.0273 | −0.0606 | −0.1348 | −0.0130 | −0.3284 |
| 9 | 0.0273 | 0.0575 | 0.1212 | 0.0154 | 0.2878 |
| 10 | 9.8713 | −2.6717 | 0.7231 | 0.4979 | −0.3305 |
| 11 | −5.3357 | 1.6095 | −0.4855 | −0.4076 | 0.2694 |
| 12 | −1.2512 | −0.8855 | −0.6267 | −0.2391 | −0.6127 |
| 13 | 0.0458 | −0.0531 | 0.0615 | −0.3753 | 0.3635 |
| 14 | −0.1180 | −0.0620 | −0.0326 | −0.0026 | −0.0185 |
| 15 | 3.9041 | −0.4442 | 0.0505 | 0.6103 | −0.0752 |
| 16 | −0.002 | −0.0020 | −0.0238 | 0.0505 | 0.3165 |
| 17 | 5.2503 | −0.6196 | 0.0731 | 0.2963 | −0.0436 |
| Σ | 1.0664 | −0.0635 | −0.0230 | 0.1412 | 0.1777 |

What is claimed is:

1. A retrofocus wide-angle objective lens system with large relative aperture comprising eight optically aligned lens components of which the first component is a concave meniscus lens of rearward concavity, the second component is a convex lens, the third component is a concave meniscus lens of rearward concavity, the fourth component is a convex lens of strong forward convexity, the fifth component is a convex lens of strong rearward convexity, the sixth component is a bi-concave lens, the seventh component is a convex meniscus doublet consisting of a concave lens and a convex lens cemented together and the eighth component is a bi-convex lens, and having a diaphragm interposed between the fifth and sixth components, and said objective lens system being characterized by the following relationships in combination:

$$0.4f < d_7 + d_8 + d_9 < 0.75f \quad (1)$$

$$0.68 < \frac{|r_{13}|}{r_{12}} < 1.75, \quad r_{13} < 0 \quad (2)$$

$$0.05f < d_{12} < 0.105f \quad (3)$$

$$1.73 < (N_8 + N_9)/2 \quad (4)$$

$$\nu_4 < 35 \quad (5)$$

$$2.5 < \nu_6 - \nu_7 < 17 \quad (6)$$

wherein $f$ is the equivalent focal length of the entire lens system, $d_7$ is the axial thickness of the fourth component, $d_8$ is the axial air separation between the fourth and fifth components, $d_9$ is the axial thickness of the fifth component, $r_{12}$ is the radius of curvature of the rear refracting surface of the sixth component, $r_{13}$ is the radius of curvature of the front refracting surface of the seventh component, $d_{12}$ is the axial air separation between the sixth and seventh components, $N_8$ is the refractive index of the convex lens of the seventh doublet lens component for the sodium $d$-line of the spectrum, $N_9$ is the refractive index of the eighth convex lens component for the sodium $d$-line of the spectrum, $\nu_4$ is the Abbe number of the fourth convex lens component, $\nu_6$ is the Abbe number of the sixth bi-concave lens component, and $\nu_7$ is the Abbe number of the concave lens of the seventh doublet lens component.

2. A retrofocus wide-angle objective lens system with large relative aperture comprising eight optically aligned lens components of which the first component is a concave meniscus lens of rearward concavity, the second component is a convex lens, the third component is a concave meniscus lens of rearward concavity, the fourth component is a convex lens of strong forward convexity, the fifth component is a convex lens of strong rearward convexity, the sixth component is a bi-concave lens, the seventh component is a convex meniscus doublet consisting of a concave lens and a convex lens cemented together and the eighth component is a bi-convex lens, and having a diaphragm interposed between the fifth and sixth components, and said objective lens system being characterized by the following relationships in combination:

$$0.35f < d_7 + d_8 + d_9 < 0.8f \quad (1)$$

$$0.5 < \frac{|r_{13}|}{r_{12}} < 2.0 \quad ; \quad r_{13} < 0 \quad (2)$$

$$0.03f < d_{12} < 0.13f \quad (3)$$

$$1.73 < \frac{N_8 + N_9}{2} \quad (4)$$

$$\nu_4 < 35.0 \quad (5)$$

$$2.0 < \nu_6 - \nu_7 < 20.0 \quad (6)$$

wherein $f$ is the equivalent focal length of the entire lens system, $d_7$ is the axial thickness of the fourth component, $d_8$ is the axial air separation between the fourth and fifth components, $d_9$ is the axial thickness of the fifth component, $r_{12}$ is the radius of curvature of the rear refracting surface of the sixth component, $r_{13}$ is the radius of curvature of the front refracting surface of the seventh component, $d_{12}$ is the axial air separation between the sixth and seventh components, $N_8$ is the refractive index of the convex lens of the seventh doublet lens component for the sodium $d$-line of the spectrum, $N_9$ is the refractive index of the eighth convex lens component for the sodium $d$-line of the spectrum, $\nu_4$ is the Abbe number of the fourth convex lens component, $\nu_6$ is the Abbe number of the sixth bi-concave lens component, and $\nu_7$ is the Abbe number of the convex lens of the seventh doublet lens component, the characteristics of the various lenses of the components and their special relationships to each other being of the proportions indicated by the numerical data in the following table,

| $f = 1$ | | F 2.0 | | $2 = 76°$ |
|---|---|---|---|---|
| $r_1$ = | 1.7090 | | | |
| | | $d_1$ = 0.0707 | $N_1$ = 1.64328 | $\nu_1$ = 47.85 |
| $r_1$ = | 0.8800 | | | |
| | | $d_2$ = 0.2743 | | |
| $r_3$ = | 2.5246 | | | |
| | | $d_3$ = 0.1646 | $N_2$ = 1.58913 | $\nu_2$ = 61.11 |
| $r_4$ = | −9.0518 | | | |
| | | $d_4$ = 0.0661 | | |
| $r_5$ = | 1.3704 | | | |
| | | $d_5$ = 0.0536 | $N_3$ = 1.65100 | $\nu_3$ = 56.15 |

-continued

| | f = 1 | | | F 2.0 | | 2ω = 76° |
|---|---|---|---|---|---|---|
| $r_6$ | = | 0.4995 | | | | |
| | | | $d_6$ | = | 0.2571 | |
| $r_7$ | = | 1.1928 | | | | |
| | | | $d_7$ | = | 0.0821 $N_4 = 1.75520$ | $\nu_4 = 27.51$ |
| $r_8$ | = | 3.4759 | | | | |
| | | | $d_8$ | = | 0.0357 | |
| $r_9$ | = | 3.6293 | | | | |
| | | | $d_9$ | = | 0.6179 $N_5 = 1.67790$ | $\nu_5 = 55.33$ |
| $r_{10}$ | = | −0.8696 | | | | |
| | | | $d_{10}$ | = | 0.1536 | |
| $r_{11}$ | = | −0.8850 | | | | |
| | | | $d_{11}$ | = | .0611 $N_6 = 1.62004$ | $\nu_6 = 36.25$ |
| $r_{12}$ | = | 1.5573 | | | | |
| | | | $d_{12}$ | = | 0.1036 | |
| $r_{13}$ | = | −1.4292 | | | | |
| | | | $d_{13}$ | = | 0.0357 $N_7 = 1.80518$ | $\nu_7 = 25.43$ |
| $r_{14}$ | = | 2.0409 | | | | |
| | | | $d_{14}$ | = | 0.1654 $N_8 = 1.77250$ | $\nu_8 = 49.57$ |
| $r_{15}$ | = | −0.7961 | | | | |
| | | | $d_{15}$ | = | 0.0036 | |
| $r_{16}$ | = | 3.2359 | | | | |
| | | | $d_{16}$ | = | 0.1361 $N_9 = 1.77250$ | $\nu_9 = 49.57$ |
| $r_{17}$ | = | −2.3112 | | | | |
| | | | | | Back focus = 1.3346. | |

3. A retrofocus wide-angle objective lens system with large relative aperture comprising eight optically aligned lens components of which the first component is a concave meniscus lens of rearward concavity, the second component is a convex lens, the third component is a concave meniscus lens of rearward concavity, the fourth component is a convex lens of strong forward convexity, the fifth component is a convex lens of strong rearward convexity, the sixth component is a bi-concave lens, the seventh component is a convex meniscus doublet consisting of a concave lens and a convex lens cemented together and the eighth component is a bi-convex lens, and having a diaphragm interposed between the fifth and sixth components, and said objective lens system being characterized by the following relationships in combination:

$$0.35f < d_7 + d_8 + d_9 < 0.8f \quad (1)$$

$$0.5 < \frac{|r_{13}|}{r_{12}} < 2.0 \; ; \; r_{13} < 0 \quad (2)$$

$$0.03f < d_{12} < 0.13f \quad (3)$$

$$1.73 < \frac{N_8 + N_9}{2} \quad (4)$$

$$\nu_4 < 35.0 \quad (5)$$

$$2.0 < \nu_6 - \nu_7 < 20.0 \quad (6)$$

wherein $f$ is the equivalent focal length of the entire lens system, $d_7$ is the axial thickness of the fourth component, $d_8$ is the axial air separation between the fourth and fifth components, $d_9$ is the axial thickness of the fifth component, $r_{12}$ is the radius of curvature of the rear refracting surface of the sixth component, $r_{13}$ is the radius of curvature of the front refracting surface of the seventh component, $d_{12}$ is the axial air separation between the sixth and seventh components, $N_8$ is the refractive index of the convex lens of the seventh doublet lens component for the sodium $d$-line of the spectrum, $N_9$ is the refractive index of the eighth convex lens component for the sodium $d$-line of the spectrum, $\nu_4$ is the Abbe number of the fourth convex lens component, $\nu_6$ is the Abbe number of the sixth bi-concave lens component, and $\nu_7$ is the Abbe number of the concave lens of the seventh doublet lens component, the characteristics of the various lenses of the components and their special relationships to each other being of the proportions indicated by the numerical data in the following table,

| | f = 1 | | | F 2.8 | | 2ω = 80° |
|---|---|---|---|---|---|---|
| $r_1$ | = | 1.4927 | | | | |
| | | | $d_1$ | = | 0.0563 $N_1 = 1.66672$ | $\nu_1 = 48.32$ |
| $r_2$ | = | 0.7418 | | | | |
| | | | $d_2$ | = | 0.1336 | |
| $r_3$ | = | 1.4464 | | | | |
| | | | $d_3$ | = | 0.1542 $N_2 = 1.62041$ | $\nu_2 = 60.27$ |
| $r_4$ | = | 27.1473 | | | | |
| | | | $d_4$ | = | 0.0704 | |
| $r_5$ | = | 1.1989 | | | | |
| | | | $d_5$ | = | 0.0423 $N_3 = 1.67790$ | $\nu_3 = 55.33$ |
| $r_6$ | = | 0.4236 | | | | |
| | | | $d_6$ | = | 0.2714 | |
| $r_7$ | = | 1.2905 | | | | |
| | | | $d_7$ | = | 0.0648 $N_4 = 1.80518$ | $\nu_4 = 25.43$ |
| $r_8$ | = | 34.2692 | | | | |
| | | | $d_8$ | = | 0.0423 | |
| $r_9$ | = | 24.0238 | | | | |
| | | | $d_9$ | = | 0.3358 $N_5 = 1.58913$ | $\nu_5 = 61.11$ |
| $r_{10}$ | = | −0.7445 | | | | |
| | | | $d_{10}$ | = | 0.1070 | |
| $r_{11}$ | = | −0.9866 | | | | |
| | | | $d_{11}$ | = | 0.2268 $N_6 = 1.67270$ | $\nu_6 = 32.10$ |
| $r_{12}$ | = | 1.6820 | | | | |
| | | | $d_{12}$ | = | 0.0507 | |
| $r_{13}$ | = | −1.1886 | | | | |
| | | | $d_{13}$ | = | 0.0338 $N_7 = 1.80518$ | $\nu_7 = 25.43$ |
| $r_{14}$ | = | −3.9876 | | | | |
| | | | $d_{14}$ | = | 0.1183 $N_8 = 1.77250$ | $\nu_8 = 49.57$ |
| $r_{15}$ | = | −0.7141 | | | | |
| | | | $d_{15}$ | = | 0.0042 | |
| $r_{16}$ | = | 8.6313 | | | | |
| | | | $d_{16}$ | = | 0.0901 $N_9 = 1.77250$ | $\nu_9 = 49.57$ |
| $r_{17}$ | = | −1.4720 | | | | |
| | | | | | Back focus = 1.4460. | |

\* \* \* \* \*